United States Patent [19]
Chiang

[11] Patent Number: 6,095,691
[45] Date of Patent: Aug. 1, 2000

[54] CRANK AXLE FOR BICYCLE

[76] Inventor: Douglas Chiang, 487, Ko-Chung Rd., Ta-Li City, Taichung Hsien, Taiwan

[21] Appl. No.: 09/296,592

[22] Filed: Apr. 23, 1999

[51] Int. Cl.[7] ...................................... F16C 19/49

[52] U.S. Cl. .......................... 384/458; 384/540; 384/545; 384/589

[58] Field of Search .................................. 384/458, 457, 384/540, 545, 589

[56] References Cited

U.S. PATENT DOCUMENTS 5,813,770   9/1998   Chiang .

*Primary Examiner*—Lenard A. Footland
*Attorney, Agent, or Firm*—Bacon & Thomas, PLLC

[57] ABSTRACT

An improved crank axle for bicycle is a hollow hub axle provided with a circle of tooth shape key slot at both ends respectively, arranged with a single roller bearing and the two parallel ball bearings and covered with an aluminum alloy cone-shaped sleeve. So that its can reduce the weight, facilitate assembling, keep axle rotation smoothly and receive loading strength well.

2 Claims, 4 Drawing Sheets

CRANK AXLE FOR BICYCLE

FIELD OF THE INVENTION

The present invention relates to an improved hub, more particularly, to the crank axle of a bicycle, which includes a hollow hub axle having a circle of tooth shaped keys at each of its two ends thereof. It is also provided a roller bearing and two parallel ball bearings thereon, and covered with an aluminum alloy cone-shaped sleeve with an oil inlet hole. Such combination is not only facilitate assembling but receive load strength well.

DESCRIPTION OF PRIOR ART

U.S. Pat. No. 5,813,770, issued on Sep. 29, 1998, to the same applicant has disclosed a bicycle crank axle in which two roller bearings near center and two ball bearings near both side are incorporated to supports gravitational load of axle, receives smooth rotation and avoid wearing. However, such combination is still regarded as complicate assembling, weighty, low precision for fitting and large loading stress.

SUMMARY OF THE INVENTION

It is the objective of this invention to provide an improved hub axle, which is defined a circle of tooth shape key slot at each of its ends with the advantage for quickly assembly. The hub axle is also equipped with a roller bearing and two parallel ball bearings thereon to receive load strength well, and covered with an aluminum alloy cone-shaped sleeve with which it can be tightly integrally assembled. Such combination is not only facilitate assembling but also receive high load.

BRIEF DESCRIPTION OF THE DRAWINGS

In order that the present invention may more readily be understood, the following description is given, merely by way of example with reference to the accompanying drawing, in which.

DETAILED DESCRIPTION OF PREFERRED EMBODIMENT

Figure 1:
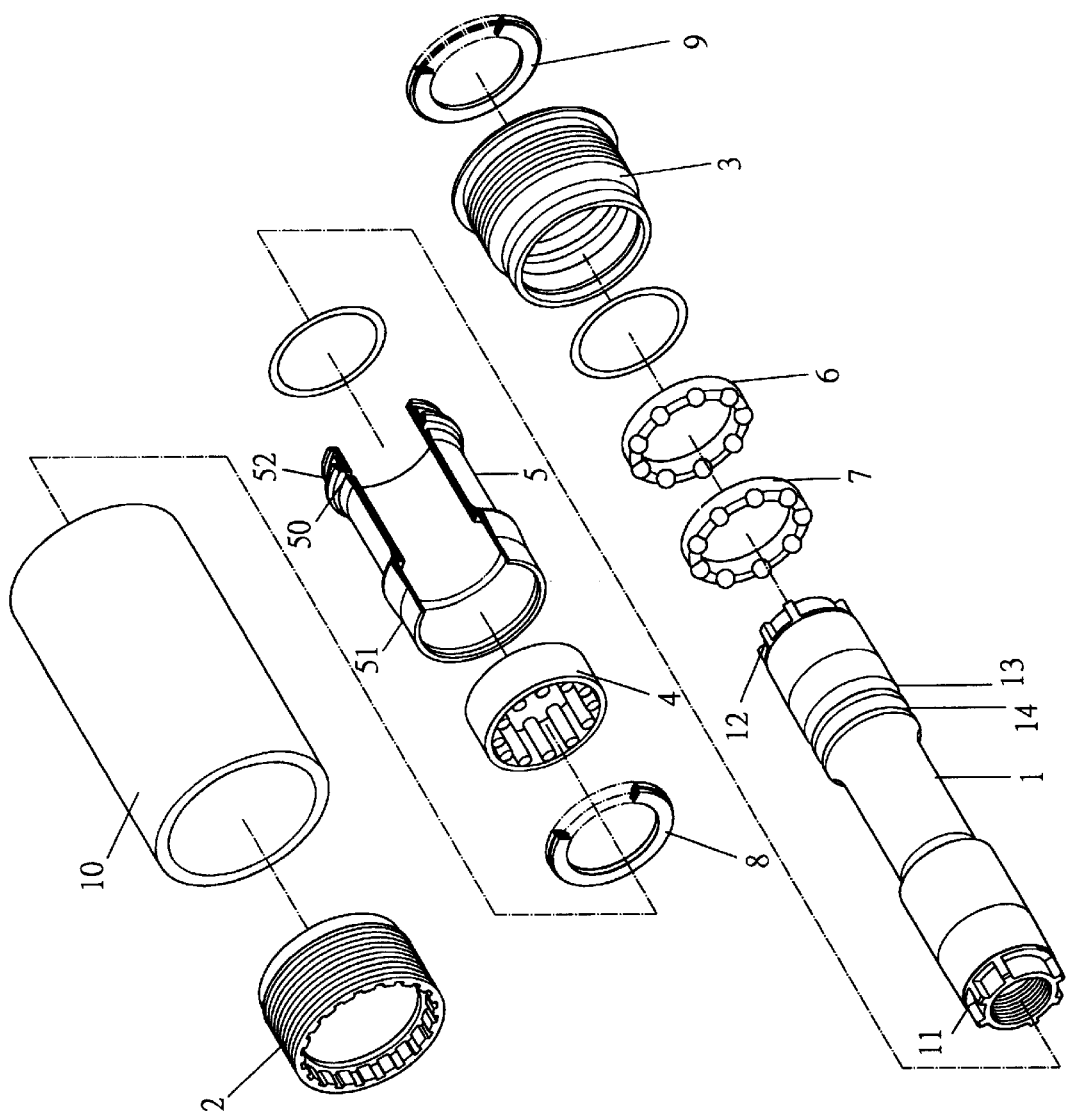
FIG. 1 is an exploded perspective view of the hub in accordance with the present invention.
Figure 2:
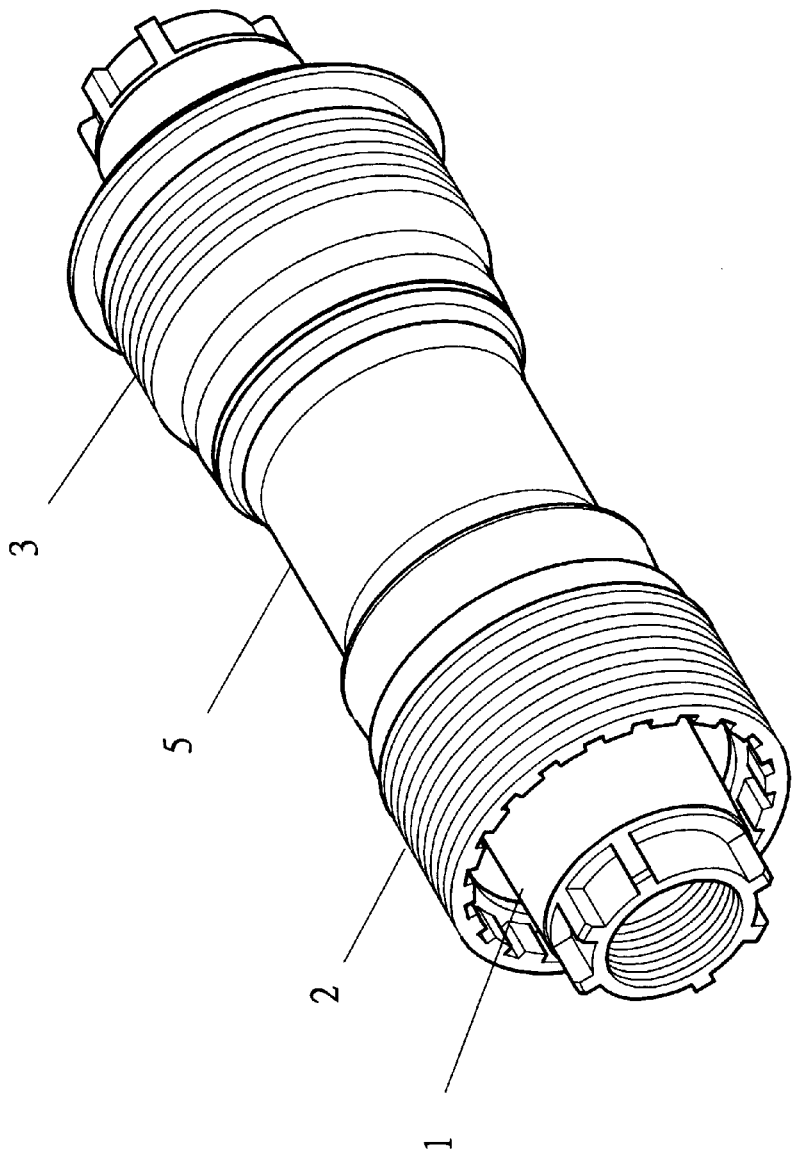
FIG. 2 is a perspective view of the present invention when assembling.
Figure 3:
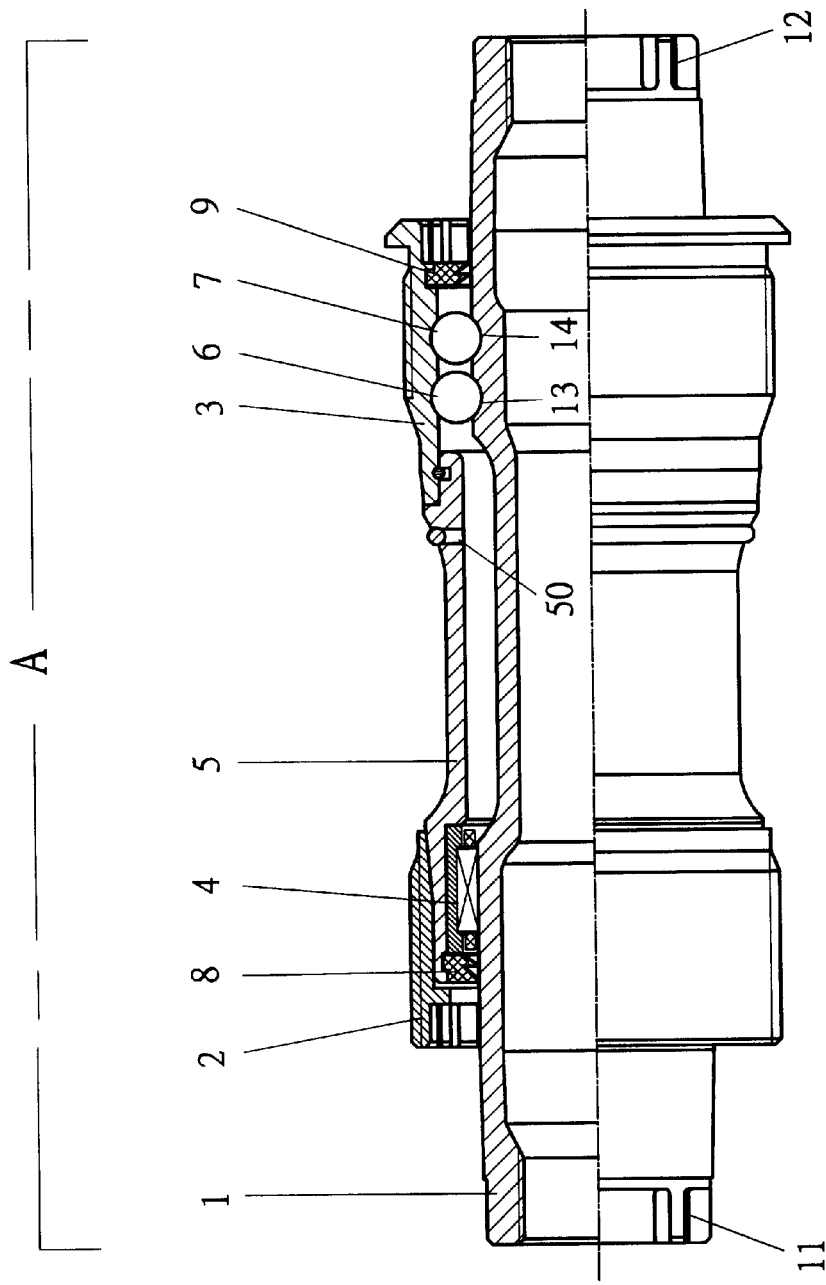
FIG. 3 is a cross sectional view of the present invention when assembling.

Referring to FIGS. 1 through 3, a hub in accordance with the present invention generally includes a hollow hub axle 1 is provided with a circle of tooth shape key slots 11 and 12 at both ends thereon. In this embodiment, there are six elongate teeth having a round bottom thereof, near one side of hollow hub axle 1 is provided with two parallel retaining grooves 13 and 14 in which the corresponding ball bearings 13 and 14 is seated, near the other side of hollow hub axle 1 is provided with a taped bevel surface thereof, such that the taper roller bearing 4 can be securely mounted onto the hollow hub axle 1 by being pulled from the side of tooth shape key slot 11 of hollow hub axle 1, besides the bearing seat 3 and the locking nut 2 are mounted into hollow hub axle 1 from left and right side of hollow hub axle 1 respectively, with an inner sleeve provided an oil-inlet hole there-between, finally the bearing seat 3 and the locking nut 2, each of which having an outer threaded periphery for being screwed engaged to the corresponding threaded portion of the frame tube 10 respectively, thus forming the structure of the present invention.

Figure 4:
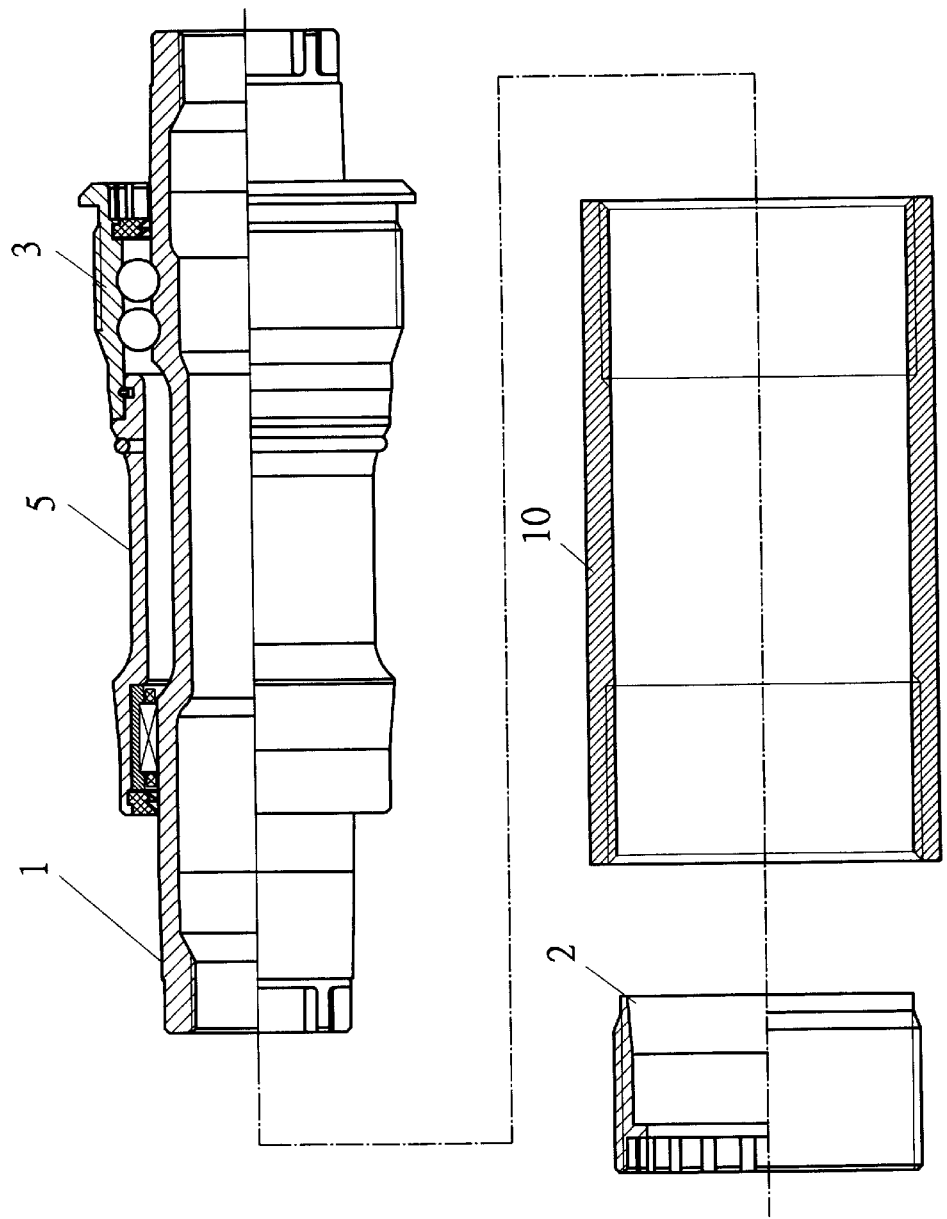
FIG. 4 is an exploded cross sectional view according to the present invention.

Referring to FIGS. 3 and 4 is a side view, partly in section of the crank axle in accordance with the present invention. When assembling, the taper roller bearing 4 is disposed on the one side of the hollow hub axle 1 first, then two parallel ball bearings 13 and 14 is seated on the corresponding retaining grooves 13 and 14 provided by the other side of hollow hub axle 1, and dust seals 8 and 9 are mounted onto the two side of hollow hub axle 1 respectively, then push hollow hub axle 1 through the hollow hole of inner sleeve 5 from the placket end thereof, the taped bevel surface 51 and the extend flange 52 provided on each side of inner sleeve 5 are tightly mounted by locking nut 2 and bearing seat 3 respectively, the hollow hub axle 1 assembled with above procedure are tightly incorporated by locking nut 2, bearing seat 3 and inner sleeve 5, finally combined with frame tube 10 to finish this assembly (shown in FIGS. 3 and 4).

The present invention emphasizes on the design of hollow hub axle arranged with the single roller bearing 4 and the two parallel ball bearings 6 and 7 at the each side respectively, Such combination not only facilitate assembling and keep axle rotation smoothly but also receive load strength well. On the other hand, hollow hub axle 1 with aluminum alloy cone-shaped sleeve not only reduce the weight, also because of the tooth shape key slots 11 and 12 at the end of hollow hub axle 1, it will more precisely fit with bicycle crank and thus enhance safety. As a result, the key points of this invention are that the structure is light, assembling is easy, and safety are all further enhanced.

Although the invention has been explained in relation to its preferred embodiment, it is to be understood that many other possible modification and variations can be made without departing from the spirit and scope of the invention as hereinafter claimed.

I claim:

1. An improved crank of a bicycle, comprising a crank axle having a said hollow hub axle provided with a circle of tooth shape key slot at both ends respectively, said crank axle being further provided with two parallel ball groove thereof, besides, composes with a lock nut and a bearing seat and arranged with a single roller bearing at the other side in contrast with ball groove side, on the other hand, pulled on a suitable length aluminum alloy cone shape sleeve, said inner sleeve, with a placket shape at one end, an oil inlet hole thereof can tightly conjugate with a lock nut and a bearing seat at each of both sides thereof respectively, finally, engaged with two ball bearing and two dust seal to compose this invention.

2. As claimed in claim 1 wherein said when assembling, the taper roller bearing is disposed on the one side of the hub axle 1 first, then two parallel ball bearings is seated on the corresponding retaining grooves provided by the other side of axle, and dust seals are mounted onto the two side of axle respectively, then push axle through the hollow hole of inner sleeve from the placket end thereof, the taped bevel surface and the extend flange provided on each side of inner sleeve are tightly mounted by lock nut and bearing seat respectively, the axle assembled with above procedure are tightly incorporated by lock nut, bearing seat and inner sleeve.

* * * * *